April 25, 1933.  J. A. V. TURCK  1,905,579
CALCULATING MACHINE
Filed April 30, 1929  7 Sheets-Sheet 1
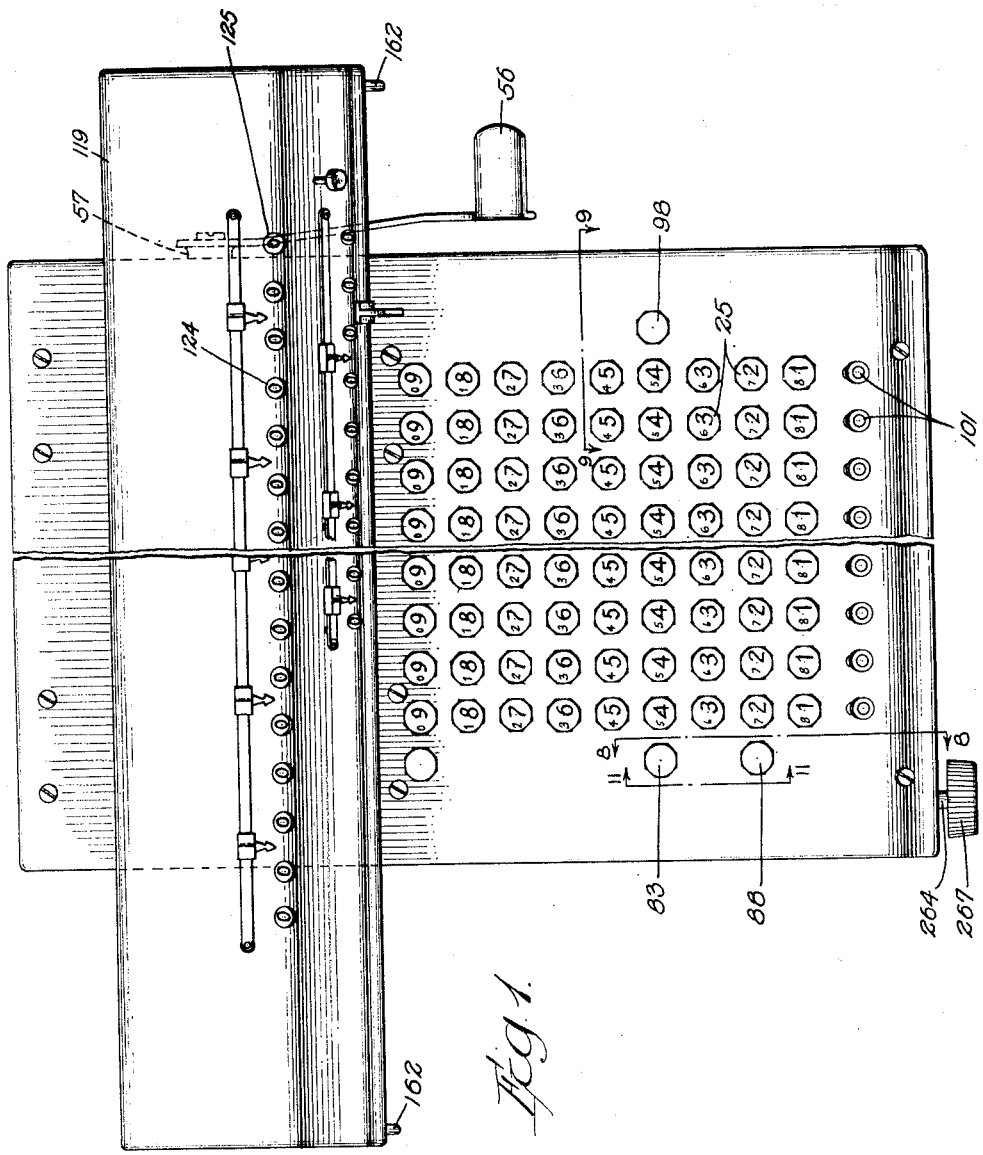
Inventor:
Joseph A. V. Turck
By Henry Love Clarke
his Atty.

April 25, 1933.  J. A. V. TURCK  1,905,579
CALCULATING MACHINE
Filed April 30, 1929   7 Sheets-Sheet 2
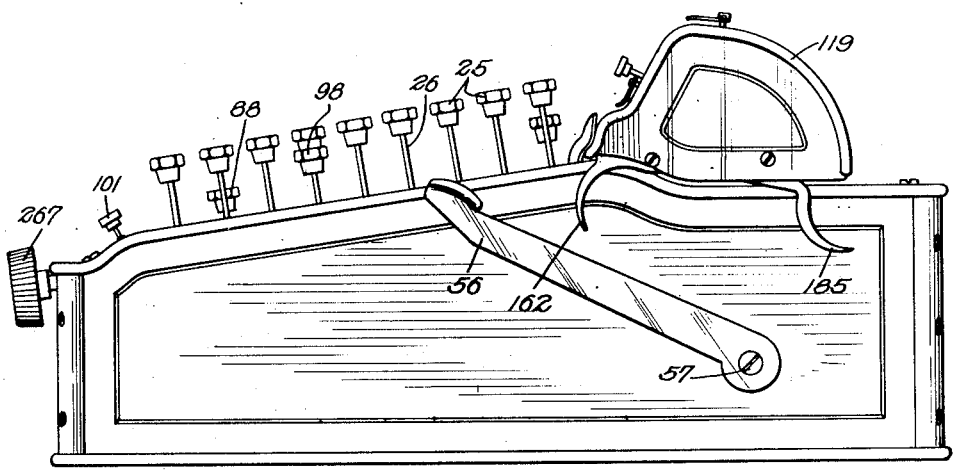
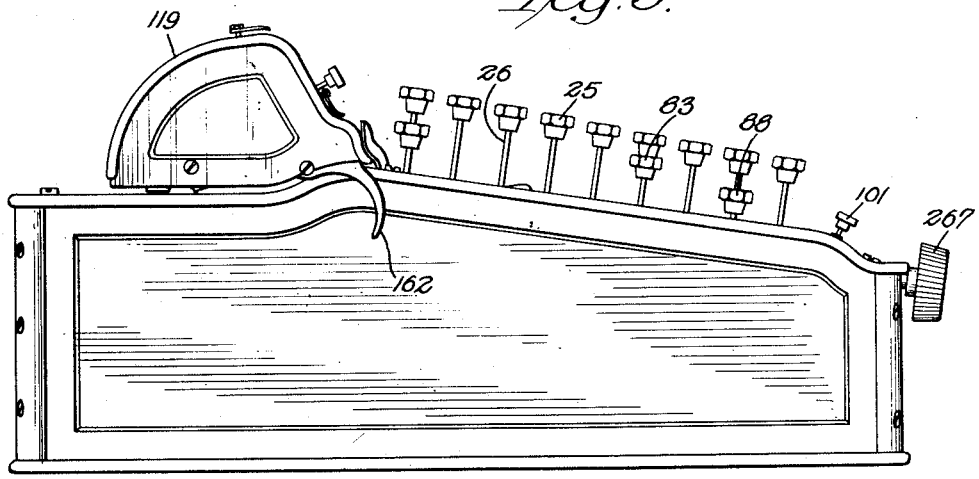
Inventor:
Joseph A. V. Turck
By Henry Love Clarke
his Atty.

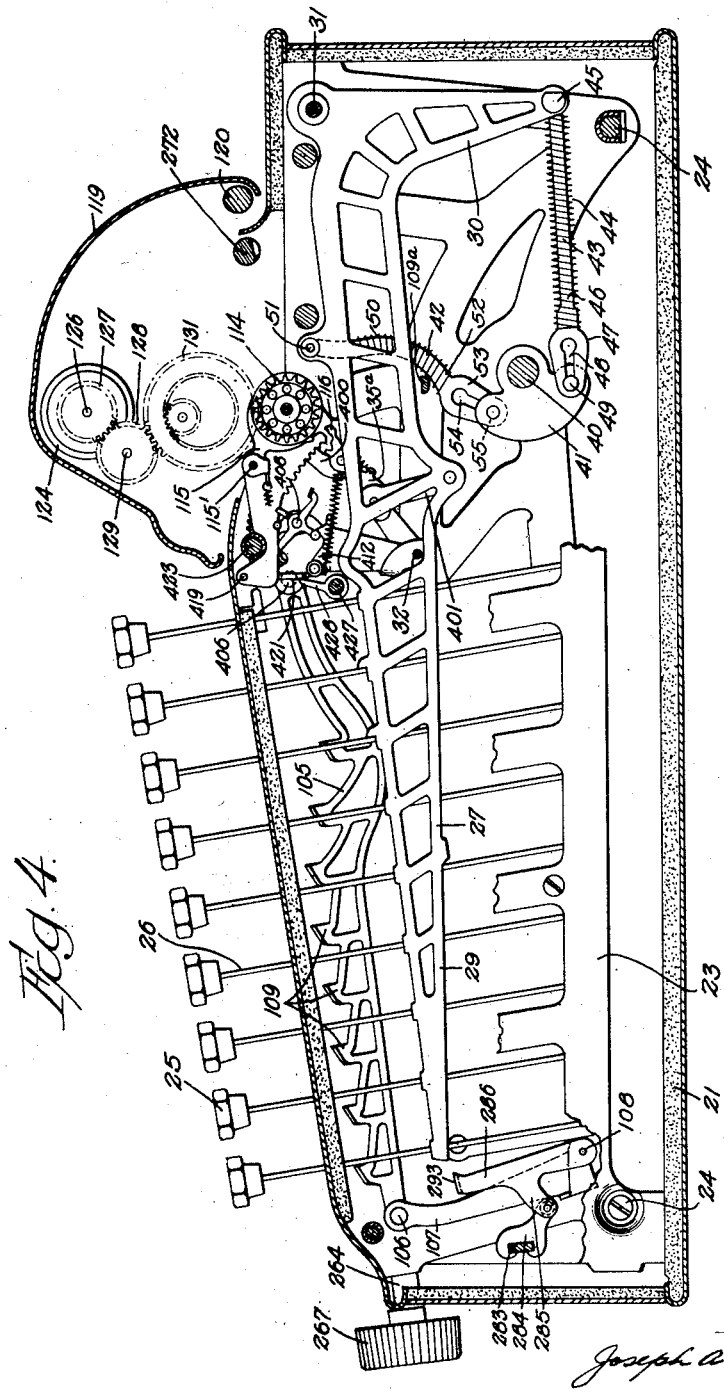

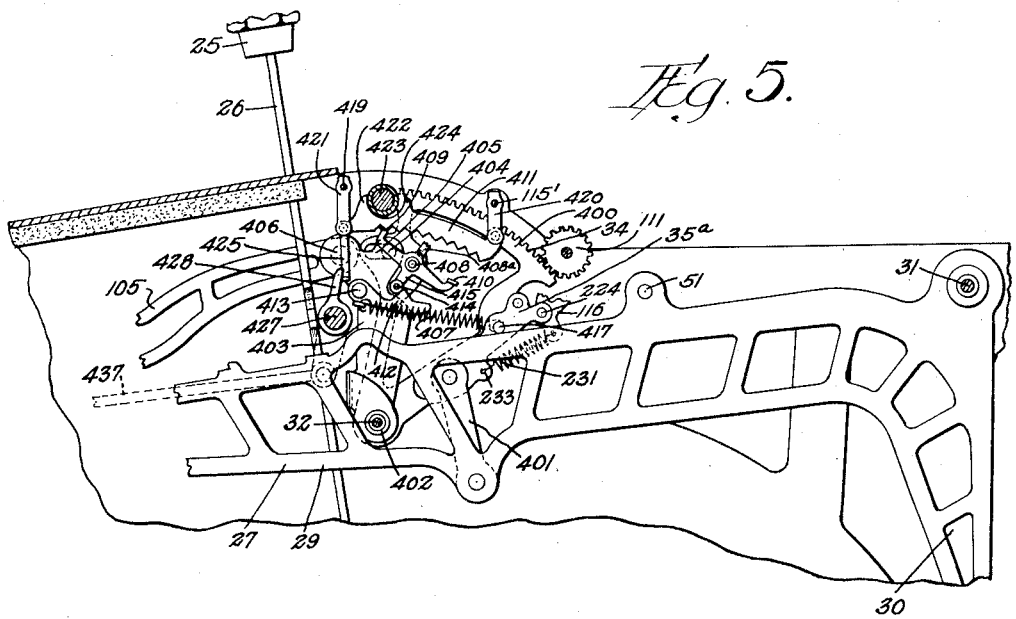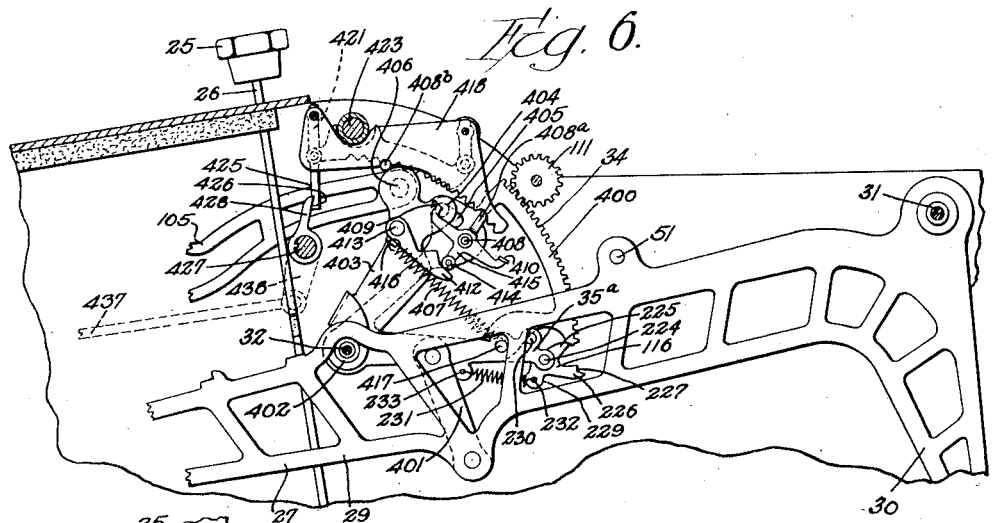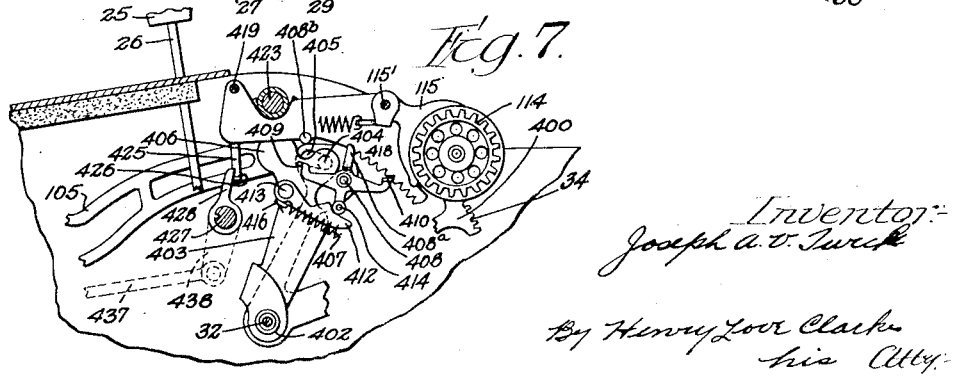

April 25, 1933. J. A. V. TURCK 1,905,579
CALCULATING MACHINE
Filed April 30, 1929 7 Sheets-Sheet 5
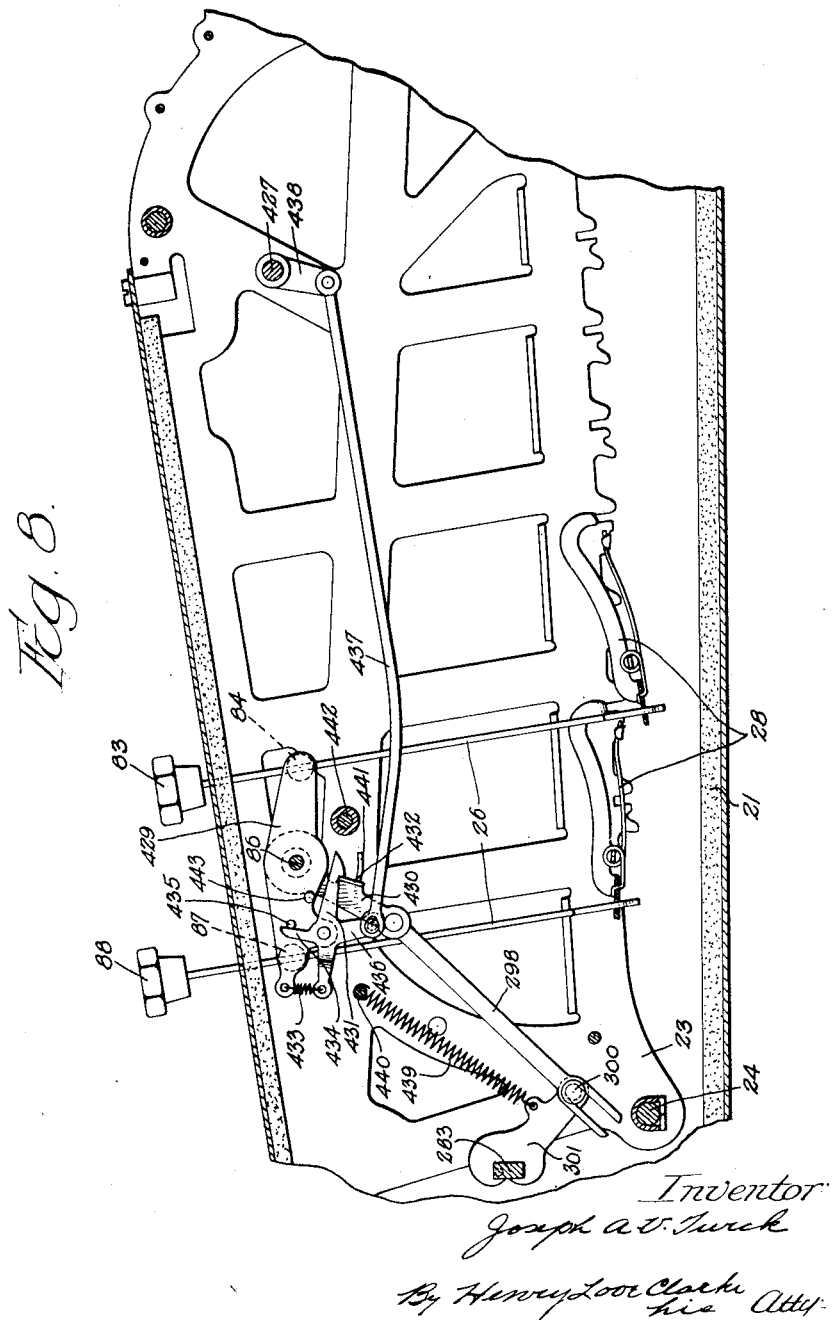

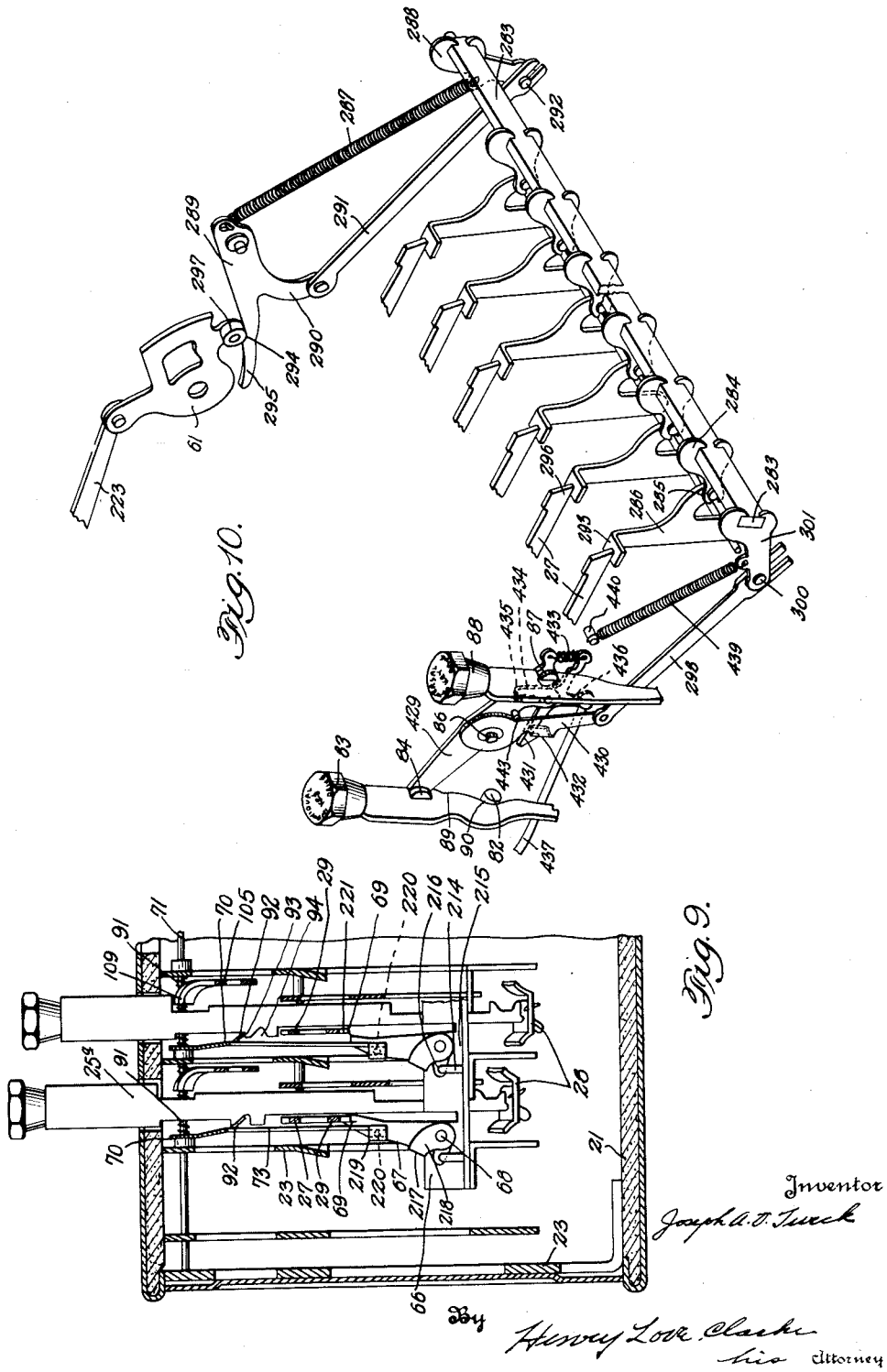

April 25, 1933.  J. A. V. TURCK  1,905,579

CALCULATING MACHINE

Filed April 30, 1929   7 Sheets-Sheet 7

Inventor
Joseph A. V. Turck
By Henry Love Clarke
Attorney

Patented Apr. 25, 1933

1,905,579

UNITED STATES PATENT OFFICE

JOSEPH A. V. TURCK, OF WILMETTE, ILLINOIS, ASSIGNOR TO FELT & TARRANT MANUFACTURING COMPANY, OF CHICAGO, ILLINOIS, A CORPORATION OF ILLINOIS

CALCULATING MACHINE

Application filed April 30, 1929. Serial No. 359,262.

This invention relates in general to improvements in calculating machines. More particularly the invention relates to improvements in calculating machines of the multiple order key-driven type and especially to calculating machines of said type that are alternatively operable by individual keydrive, namely, key by key, or key-set universal drive, that is, a single member operating many key-set mechanisms, and that include an accumulator mechanism of greater capacity than the keyboard, such as to register a product of many figures more than the number of mechanisms, said accumulator being alternatively either stationary or shiftable for key-driven actuation or else either stationary or shiftable for key-set universal actuation, as shown in my prior copending applications Serial No. 654,874, filed July 31, 1923, and Serial No. 107,527, filed May 7, 1926.

Objects of the invention are to provide machines of the above noted type with full stroke devices that will lock all other orders of the keyboard on a short down stroke or partial key stroke in any ordinal column of the keyboard, and leave the column or columns in which a partial or short key stroke has been made subject to completion of the partial key stroke, and that will lock said column or columns when completion of the partial key stroke is finished; to provide said machines with devices that compel complete return of the keys and their column actuators before another stroke can be made thereby; to provide for the employment of said devices in machines of the above mentioned type in cooperation with a stop-bar type of mechanism in which digital control is regulated by stop-bars engaging the manipulated key stems as disclosed in Patent No. 1,088,219 to Door E. Felt; to provide an improved elastic key stroke motion over that shown and described in my above noted application Serial No. 107,527; to provide a means for controlling the actuating mechanism in their various degrees of actuation during both their adding and non-adding movements, thus compelling full digital registration and return of the actuating mechanism, that may be employed with or without a mechanism for locking all orders of the keyboard; to provide an improved locking means for locking the keyboard of a calculating machine upon mismanipulation of any one or more keys thereof; to provide an improved means for compelling a complete return of a depressed key before it or another key in the same order with it may be depressed; and the invention has for further objects such other improvements and advantages in construction and operation as may be found to obtain in the structure and devices hereinafter described and claimed.

In the accompanying drawings, forming a part of this specification and showing, for purposes of exemplification, a preferred form and manner in which the invention may be embodied and practices, but without limiting the claimed invention specifically to such illustrative instance or instances:

Fig. 1 is a top plan view of a calculating machine constructed in accordance with the present invention;

Fig. 2 is a right-hand side elevation of the machine;

Fig. 3 is a left-hand side elevation of the machine;

Fig. 4 is a vertical sectional view of the machine showing the mechanism for one of the ordinal columns of keys in a right hand elevation, parts being broken away, and other parts not essential to an understanding of the present invention being omitted for clearness of illustration;

Fig. 5 is an enlarged sectional elevational view showing the mechanism immediately behind the mechanism shown in Fig. 4 in its normal position, portions of the mechanism being broken away for clearness of illustration;

Fig. 6 is an enlarged sectional elevational view of the mechanism shown in Fig. 4, but showing parts of the mechanism thereof in position during full depression of a numeral key and before such key starts in its return upstroke to normal position;

Fig. 7 is a sectional elevational view of a part of the mechanism shown in Fig. 4, on a larger scale and showing parts of the mechanism thereof in position during the return upstroke of a previously full depressed numeral key;

Fig. 8 is a vertical sectional view taken on the line 8—8 of Fig. 1 at one of the extreme left hand sections of the machine showing the mechanism for controlling the keyboard locking mechanism for key-set operation of the machine and the new devices through which the above mentioned full stroke mechanism sets the keyboard locking mechanism during key-driven operation;

Fig. 9 is a vertical transverse sectional view taken on the line 9—9 of Fig. 1 showing the column actuator locking mechanism and key-set locking mechanism which also acts to release the column-actuators of actuator locks;

Fig. 10 is a perspective view illustrating the non-adding lock for key action under universal drive operation, and devices for releasing the actuating-levers during action of the universal drive;

Figure 11:
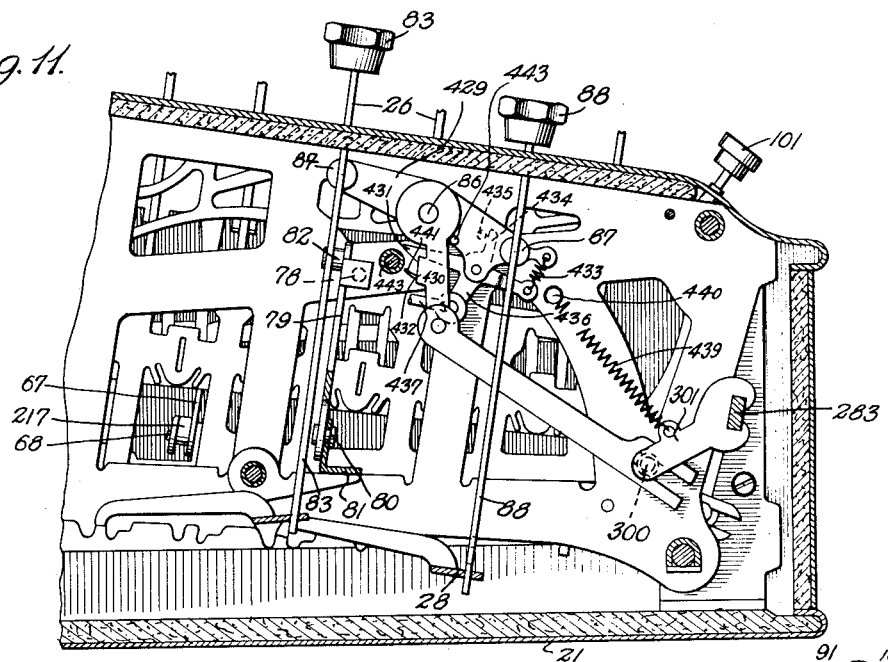
Figure 12:
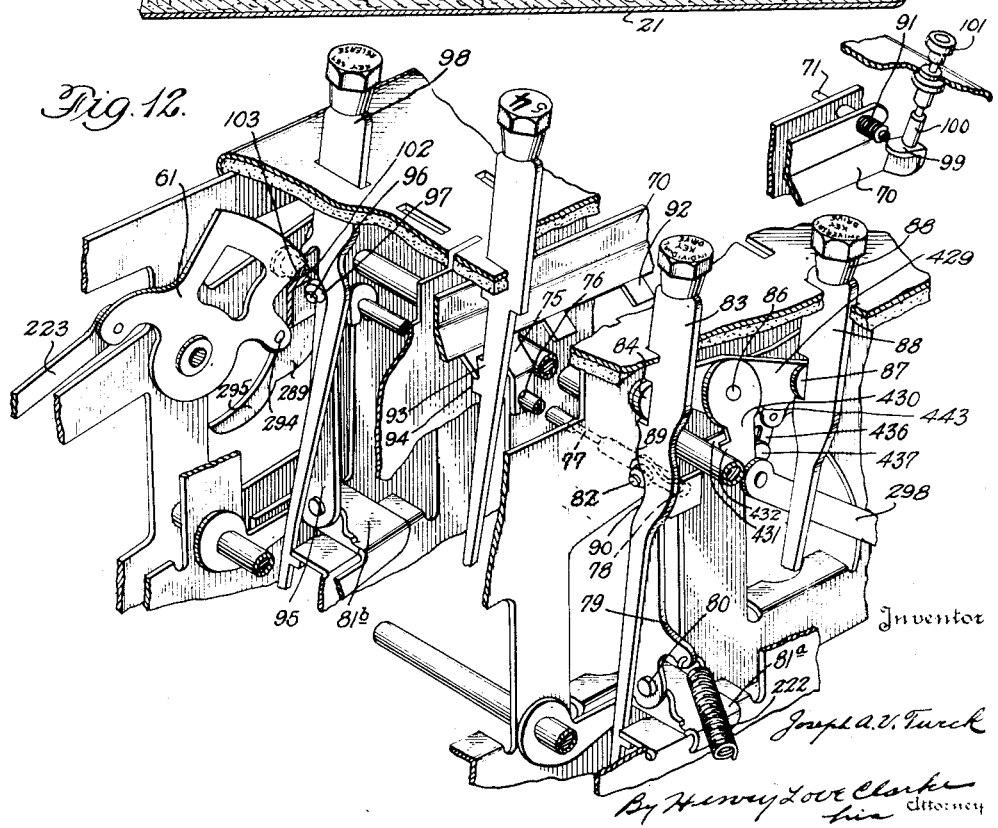

Fig. 11 is a fragmentary, vertical, longitudinal, sectional view taken on line 11—11 of Fig. 1, showing non-adding lock as to key action under key set operation, and also showing selective drive-setting device; and Fig. 12 is a longitudinal sectional view showing the selective drive-setting device and the arrangement for locking the universal drive against actuation operation while the machine is set for individual-key-driven actuation.

In its present embodiment the invention is described in connection with and as an improvement upon the machine shown, described and claimed in the above noted co-pending applications of the present inventor, Joseph A. V. Turck, Serial No. 654,874, filed July 31, 1923, and Serial No. 107,527, filed May 7, 1926, and entitled Calculating machines. The novel features of the present invention are, however, readily susceptible of other valuable application, for example, with other types of adding and calculating machines, hence the invention is not confined to the specific embodiment herein described as an illustrative example.

As the details of construction and operation of this type of machine may be readily understood from said applications, a brief description of the general features of this type of machine, and of such parts as are directly concerned with the operation of the present improvements, will be sufficient for an understanding of the present invention.

The calculating machine shown and described in said co-pending applications and in which the present invention is embodied is alternatively operable by individual key-drive, that is, key-by-key, or by key-set universal drive, that is, a single member operating many key-set mechanisms, and includes an accumulator mechanism of greater capacity than the keyboard, such as to register a product of many figures more than the number of actuating mechanisms, said accumulator mechanism being alternatively either stationary or shiftable for key-driven actuation or else either stationary or shiftable for key-set universal actuation. In the machine of the present invention, the operator has the choice of either a key-drive or a key-set universal drive when performing calculation, whether positively as in addition or multiplication, or negatively, as in subtraction or division. In performing multiple stroke calculation, whether positively as in multiplication or negatively as in division, the operator may employ the individual key-drive with or without shift of the accumulator mechanism, or the universal drive with shift of the accumulator mechanism for the accumulation of each order or multiple stroke factor.

The various instrumentalities which constitute the actuating mechanism from which calculative motion is transmitted to the accumulator mechanism are supported by a frame mounted on a base 21 of an enclosing casing, said frame consisting of side skeleton plates 23 disposed between the various actuating mechanisms of the several orders of the machine, and all tied together at suitable points by transverse tie rods 24. The various orders of the actuating mechanism are stationary, that is, there is no shift from order to order of the actuating mechanism. In performing multiple-stroke key-set universal drive calculation, shifting is effected by the carriage which supports the accumulator mechanism, as hereinafter described.

A number of columns of nine keys each are provided, a column for each order of the machine. Each column of keys 25 corresponds with a column actuator and attendant parts and constitutes a mechanism either for driving the column actuator an amount proportionate to the digital value of the particular key 25 operated or for setting and controlling the column actuator to be otherwise driven a like amount. The keys of each column are numbered from "1" to "9" and complementally for negative calculation from "8" to "0" in front to rear order of the machine; the key at the extreme front is adapted to effect or otherwise to control operation of the column actuator through an arc substantially one-ninth of that produced by the operation of the key at the extreme rear of the machine, and upon depression of intermedially positioned keys, the column actuator is or may be moved through various arcs respectively determined by the digital value of the intermediate keys depressed. Each key 25 is provided with a stem 26 extending down and bearing upon the corresponding column actuator 27 for key-driven actuation of the machine. Spring mechanisms 28 similar to those employed in the well-known comptometer machines are utilized for the purpose of restoring the respective keys 25 to normal independently of the column actuators.

There is a column actuator 27 for each ordinal column of nine keys 25 of the machine, and each column actuator is preferably constructed in the form of a bell-crank lever having a long, horizontal arm 29, a relatively short depending vertical arm 30, and being pivoted at the junction point of said arms to the framework at the rear of the machine as shown at 31. The horizontal arm 29 of the column actuator extends forwardly of the machine and receives the key-impulse to actuate the accumulator, when the machine is set for key-driven actuation. Pivoted at 32 on a fixed shaft extending through and supported by the framework of the machine is an actuator sector 400 for transmitting the calculative motion of the column actuator to the accumulator. The pivoted sector 400 is provided with a set of gear teeth 34 on its arcuate periphery and said teeth are adapted to mesh with ordinal gears 111 forming a part of a ratchet mechanism interposed between it and a transmitting gear 114 for actuating the transmitting gear 114. Cooperating with the ratchet mechanism are the usual stop devices for preventing erroneous operation, said devices including the spring actuated double armed back-stops 115 pivotally mounted at 115' and providing two pawls that function as a double escapement or pallet motion mechanism, and the spring actuated actuating-stop over-throw prevention pawl member 116 that is pivotally mounted at 224 on the upper end of the rear arm 35ᵃ of sector 400, and that is provided with two arms 225 and 226, the last mentioned arm being notched at 227, so that upon completion of the upward movement of the sector 400 the arm 225 is first engaged by parts of the interposed ratchet mechanism and slightly pulls the arm 226 into position with respect to the ratchet mechanism. The stop 116 has an arm 229 that engages a pin 230 on the arm 35ᵃ to limit the movement of the stop 116, and a spring 231 engages the member 116 at 232 and has its other end fastened to the arm 35ᵃ at 233.

The accumulator mechanism is optionally either stationary with respect to the several orders of the actuating mechanism (both for individual key-driven actuation or for key-set universal drive actuation) or shiftable both for key-set universal drive multiple stroke actuation or for individual key-driven multiple stroke actuation. The accumulator mechanism includes the numeral wheels, and the interposed transmission gearing mechanism which receives direct incremental actuation from the column actuators and transfers it to the numeral wheels of the corresponding orders and also receives or transmits indirect actuation from a lower order gearing to a higher order gearing for effecting carrying of the tens from order to order, whenever a numeral wheel of a lower order passes from the "9" point, whether in gear with the actuating mechanism or not. The carriage comprises a top casing 119 both pivotally and slidably mounted on a rod 120 supported from the top of the fixed framework of the machine and is preferably constructed of a width somewhat greater than the width of the stationary casing to support a number of accumulator orders in excess of the orders of the actuating mechanism. In the machine illustrated in the drawings there are eight columns of the actuating mechanism and fifteen columns or orders of the accumulator mechanism. The numeral wheels 124 for registering accumulation are each provided with the usual nine digits and with the zero mark, which may be viewed through sight openings 125 in the cover plate of the carriage. The numeral wheels of the respective orders of the accumulator mechanism are mounted to rotate on cross-rods or fixed supporting shafts 126 supported by framework in the carriage and each numeral wheel is provided with its operating gear 127 in mesh with a gear 128 mounted on a parallel cross-rod 129.

For shifting the carriage and its contained accumulator mechanism, there are provided at its opposite ends handles 162 so that the carriage may be first swung upwardly on its supporting rod 120 and then shifted transversely on the stationary casing of the machine as required or may be shifted by manipulation of knob 267 secured to a rod 264 provided at the left-hand side of the machine and adapted to shift the rods 272 and 120 either to the left or to the right of the machine depending upon the direction of rotation of the knob 267 and the rod 264. The shifting of the carriage by means of the handles 162 or knob 267 effects lifting of the carriage to disentrain the accumulator mechanism from the ordinal actuating mechanism by disengaging the gears 131 from gears 114. Such lifting of the carriage by handles 162 or knob 267 is not effective for zeroization since the usual locks for preventing the numeral wheels from returning to zero are not affected by manipulation of the handles 162 and the knob 267. For zeroization, zeroizing mechanism, indicated generally at 185 and more fully shown in my aforesaid pending applications, is provided which is effective, when the handle lever 185 is pulled toward the front of the machine, to lift the carriage to disentrain the accumulator mechanism from the actuating mechanism and to hold the above mentioned locks for preventing the numeral wheels from returning to zero out of operation thereby effecting zeroization of the numeral wheels.

In key-driven actuation, the column actuators are restored to normal, that is, the horizontal arms 29 of said actuators are lifted, respectively by the key-arm-driven functioning member of the corresponding dual flexible link mechanism. This mechanism provides power for restoring the column actuators to normal in key-driven actuation, relieves the column actuators from the stress of such power in key-set universal drive actuation, and yet provides, during universal drive actuation, a yielding connection between the column actuator and the universal actuator, permitting a constant movement of the universal actuator in all orders to take place coincidentally with a variable movement of the column actuators, or no movement at all of said column actuators, as determined by the key-setting. It also forms a flexible connection for both depressing and restoring the column actuators to normal in universal drive actuation.

The universal actuator functions as an abutment for causing the spring-tensioning that effects the return movement of the column actuators in key-driven actuation. It comprises a universal key, lever, crank, or motive power, driven oscillatory shaft 40 extending transversely of the main frame. Fixed to said shaft 40 so as to partake of its oscillatory movement are universal actuator plate members 41 which correspond ordinally with the column actuators 27. It is particularly these plate members 41 which constitute the abutments for the spring-tensioning hereinafter referred to.

The dual flexible link mechanism of each column actuator and corresponding universal actuator plate comprises an upper link mechanism 42 and a lower link mechanism 43. The lower flexible link mechanism is arranged in pairs in position side by side, only one of the pair being visible in the view illustrated in Fig. 4, but one may be employed for each column actuator. Said mechanism provides the spring-tensioning which affords the power for the return of the column actuator in individual key-driven actuation. During such actuation, any tension in the upper link mechanism is relieved in the tensioning of said lower mechanism, so that the upper mechanism remains perfectly neutral in individual key-driven actuation and affords no resistance to the column actuator movement. The said lower flexible link mechanism 43 includes a horizontally disposed coil spring 44 connected at its rear end to the stud 45 at the lower end of the vertical arm 30 of the column actuator. Within the spring 44 is a ram 46 having a head 47 which projects beyond the forward end of the spring 44. The forward end of the spring is secured to the head 47. In length the ram 46 is so proportioned relatively to the spring 44, that, when the rear end of the ram touches the abutment 45, the column actuator is relieved of such spring tension. The head 47 is provided with a slot 48 extending parallel with the ram body 46 and the forward end of the ram is slidably attached to the lower end of the corresponding universal actuator plate 41 by a stud 49 secured to said plate, which projects transversely through said slot 48. The upper flexible link mechanism 42 of each order is constituted of parts similar to those of the lower mechanism 43, but is somewhat less in length. The spring 50 is secured at its upper end, at 51, to a stud located near the rear end of the horizontal column actuator arm 29, and said spring 50 is curved to incline forwardly and downwardly toward the upper part of the universal actuator plate 41, being secured to the head 53 of the ram 52 which has a slidable connection with the plate 41 by the stud 55 which projects through the slot 54 in the ram head.

It will be noted that the upper and lower flexible link mechanisms 42 and 43 are respectively located on opposite sides of the pivotal axes 31 and 40 of the column actuator and of the universal actuator, and both said link mechanisms have slidable connections, as hereinbefore described, with the universal actuator. In individual key-driven actuation, the universal actuator including all the ordinal plates 41 is stationary, being in fact locked against movement by a device hereinafter described. When the parts are at normal, the studs 49 and 55 are respectively located at the forward and lower ends of the slots in the ram heads 47 and 53. Upon depression of a numeral key 25, the horizontal column actuator moves downwardly an amount proportional with the digital value of the key depressed. This movement of the column actuator turns the actuating sector 400 in a clockwise direction (Figs. 4 to 7) the required amount for the incremental accumulative actuation, which occurs on the reverse counter-clockwise rotation of the sector 400. The downward movement of the horizontal column actuator arm 29 causes a rearward movement of the depending column actuator arm 30 and this rearward movement of said arm stretches or tensions the spring 44 to produce power for the return movement of the column actuator inasmuch as the ram 46 remains stationary. In this manner the spring 44 of the flexible link mechanism functions as the return spring for the column actuator in individual key-driven actuation. Although the spring action of the upper flexible link mechanism 42 is opposed to that of the lower flexible link mechanism 43, the spring 50 of said upper mechanism is not tensioned in either the downward or return movement of the column actuator and thus interposes no resistance to the movements of the parts in individual key-driven actuation. The entire upper flexible link mechanism 42 moves bodily downward with the horizontal arm 29 of the column actuator, the ram head 53 with its slot 54 sliding relatively to the stud 55 on the stationary universal actuator plate.

In key-set universal-key, lever, crank, or motive power, driven calculation, the depression of any ordinal numeral key 25 merely sets the digital control and unlocks the column actuator corresponding to its order for subsequent calculative movement by the universal drive mechanism, the operation of a numeral key being merely an unlocking of an ordinal locking device corresponding to the order in which the key is depressed, as contradistinguished from an actual calculative movement produced by key-operation in individual numeral key-driven actuation of the machine. When the machine is set to operate in key-set universal drive actuation, the column actuators in all orders of the machine are locked against movement by an ordinal locking mechanism and only those column actuators are operated which have been released by a setting of one of the corresponding ordinal keys. The oscillatory movement of the universal actuator plates 41 is employed first to depress and then to elevate those column actuators which have been released from the ordinal locking mechanism by previous key-setting.

In the present embodiment of the invention, such oscillatory movement of the universal actuator is effected by the light touch of a universal-key 56 which operates the universal actuator mechanism. Such operation of the universal actuator mechanism may, however, be effected by a hand lever, crank or motive driven means. The universal key 56 is mounted on the outside of the right-hand vertical casing plate at the end of a stub-shaft 57 which it rotates, and which when rotated imparts, through appropriate connections, such as those shown and described in my aforesaid copending application Serial No. 107,527, first a counter-clockwise and next a clockwise movement to the universal actuator shaft 40 (as viewed in Figs. 4 to 7) and the series of ordinal actuator plates 41. In other words, each single depression and elevation of the universal key 56 is accompanied by a downward and upward oscillation of the universal actuator plates 41. In universal-key actuation, each single oscillation of said plates 41 effects a single incremental actuation movement of the selected column actuators.

The ordinal locking mechanism for preventing actuation of the column actuators by the universal actuator, in key-set universal-key-driven operation, is shown more particularly in Figs. 9, 11 and 12. Extending transversely of and supported by the framework is a bar 66 which constitutes the support for the ordinal actuator locks 67. These locks are respectively pivotally mounted on a pin 68 on said bar 66 and their upper free ends are provided with locking notches 69 which are projected beneath the horizontal arms 29 of the column actuators to prevent depression thereof, whenever the locks 67 have been shifted pivotally toward the left of the machine (towards the right as seen in Fig. 9) by setting the machine for key-set universal-key-driven operation. A portion 214 of the base of the bar 66 is bent upwardly adjacent the vertical leg 215 of said bar, in such manner as to leave a guide space into which extends a projecting portion 216 of the lock 67, to maintain said lock in true position. A portion of each of said locks is bent in a direction toward the rear of the machine at 217 and said portion 217 is then rebent toward the left of the machine (toward the right Fig. 9) to provide a pivotally supporting portion 218 mounted on the pin 68 thus providing a double bearing for the lock 67. Each ordinal lock 67 is controlled individually by its corresponding ordinal lock control bar 70. These bars 70 extend from front to rear in the various orders of the machine and are loosely supported by front and rear rods 71, which permit the bars to be swung individually or in unison on axis parallel with their length. Each bar 70 is provided with a depending arm 73 the lower end of which is folded U-shape, to provide a pocket, by bending a portion 219 integral with the rear edge of the arm towards the right of the machine (towards the left Fig. 9) and this portion 219 is again bent in the direction toward the front of the machine. This pocket incloses a pin 220 secured to the lock 67 near the upper end thereof. When the lower edges of the respective bars 70 are swung in unison towards the left of the machine, in a clockwise direction (towards the right, in a counter-clockwise direction, viewing Fig. 9) by the mechanism for setting the machine for key-set universal-key-driven operation, the several locks 67, through the connections 73, will be swung toward the left of the machine in a counter-clockwise direction (toward the right in a clockwise direction as viewed in Fig. 9), to move the locking notches 69 into engagement with the projection 221 of the column actuator arms 29. For this purpose each control bar 70 is provided with a depending arm 75 (see Fig. 12) provided with a slot 76 that receives the grooved portion 77 of a shift rod 78 extending transversely of the framework. The shift rod 78 is engaged at its left-hand end by the upper end of a rocker arm 79. The lower end of said rocker arm is pivoted at 80 on a bracket 81a. Projecting rearwardly from the upper end of the rocker arm 79 is a roller 82 which forms the abutment for shifting the rocker arm 79 either toward the right or toward the left of the machine, in response to operation of the control key 83. The control key 83 is designated "individual key-drive" and is provided below the top casing plate with a notch 84 that loosely receives the rear end of a walking beam 429. The center of the walking beam 429 is pivoted at 86 to the side skeleton plate of the framework and the front end of said beam is loosely mounted within a similar notch 87 in the "universal-key-drive" control key 88. The notches 84 and 87 are so located in the respective control keys 83 and 88 that the walking beam 429 will elevate one key as the other is depressed. The "individual key-drive" control key 83 is provided with an upper notch 89 and a lower notch 90 so located that when the "universal-key-drive" control key 88 is depressed the notch 90 is in engagement with the roller 82 on the upper end of the rocker arm 79, and when the "individual key-drive" control key 83 is depressed the upper notch 89 is in engagement with the roller 82. As shown in Fig. 12, the upper notch 89 is located further toward the right of the machine than the lower notch 90. When the universal-key-drive control key is depressed and the individual key-drive control key is concurrently elevated, the positioning of the notch 90 in registering with the roller 82 permits the several control bars to move toward the left side of the machine (that is, to the right of Figs. 9 and 12) to shift the several ordinal locks 67 into locking positions. This movement of the control bars 70 is accomplished by springs 91 encircling the supporting rods 71 in the various orders of the machine between each control bar and the corresponding ordinal skeleton plate and bearing on the control bars in such manner as to push their depending arms 73 toward the left of the machine, that is, toward the right-hand side of Fig. 9, to effect the movement of the several ordinal locks 67 into column actuator locking positions. On the other hand when the "individual key-drive" key 83 is depressed the upper notch 89 is brought into registry with the roller 82, and such movement of the key 83 causes the rocker arm 79 to move toward the right of the machine, with the result that the rod 78 is likewise moved to the right. This movement of the rod 78 is transmitted to the several control bars 70 in unison through the arms 75, thereby shifting all the connecting arms 73 in unison toward the right of the machine (that is, toward the left-hand of Fig. 9) to shift all of the ordinal locks 67 out of their locking positions. The last described operation effected by depression of the key 83 sets the machine for individual-key-driven actuation, whereas the depression of the key 88 sets the machine for universal-key-driven actuation.

A spring 222 is secured at one end to the lower portion of the rocker arm 79 and its other end is secured to the framework of the machine. The function of said spring is to tend to pull such rocker arm 79 and its roller 82 against the individual-key-drive control key 83 so as to reduce the pressure required of the springs 91 in shifting the rod 78 to key-set position.

As hereinbefore stated, when the machine is set for key-set universal-key-driven actuation, the depression of an ordinal numeral key 25 unlocks the ordinal locks 67 in the corresponding order. For this purpose each control bar 70 is provided with a series constituted of nine depending projections 92 which respectively correspond to the column of nine numeral keys 25 of the corresponding order of the machine. Each numeral key 25 is provided with a projection 93 located on the right-hand-side of its stem 26 and having a notch 94 which receives the corresponding projection 92 of the ordinal lock control bar when the key is in normal position. On depression of the key for key-set actuation the shoulder above the notch 94 engages the control bar projection 92, so that the downward movement of the key causes the lower edge of the control bar to move toward the right of the machine with the result that the depending connection 73 is also shifted toward the right side of the machine (toward the left of Fig. 9) to throw the ordinal lock 67 of the order corresponding with the key to inoperative position, thereby permitting the universal actuator to effect a calculative movement of the column actuator of that order. As the key 25 moves downwardly the shoulder above the notch 94 is positioned beneath the projection 92, as shown in Fig. 9, thereby holding the key depressed in key-set position until released either by the "key-set release" mechanism or as hereinafter described. After the keys of the various selected orders have been "set" as above described the universal actuator mechanism may be operated either for a single actuation, as in addition calculation, or for as many repeated actuations as desired, when performing multiple stroke calculation.

When the desired calculative actuation has been completed, whether single or multiple stroke, the several selected numeral keys 25, which have been set are restored to normal positions and the released column actuator locks of their respective orders are repositioned for locking the column actuators. This is accomplished by the universal-lock release mechanism or by changing to individual key-drive and then rechanging back to key-set universal-key-drive. Pivotally mounted on a bracket 31b at the right-hand side of the machine is a rocker arm 95 the upper end of which is slotted to receive one of the grooves of the column actuator lock shift rod 78. A roller 96 projects rearwardly from said rocker arm 95 and normally enters a notch 97 in the "key-set release" key 98, with the result that the parts remain in normal, or key-set positions. When the key 98 is depressed, its portion above the notch 97 forces the roller 96 and the upper end of the rocker arm 95 toward the right of the machine, so that the shift rod 78 is likewise moved toward the right, thereby through the arms 75, shifting the depending arms 73 toward the right side of the machine (toward the left of Fig. 9) to move all the locks 67 to their extreme releasing positions and the projection 92 away from the normal keys which they have been holding down so that any set numeral keys are permitted to rise under the actions of their springs to normal positions. When the "key-set release" key 98 is released its spring return mechanism, corresponding to the spring return mechanism 28 of the numeral key, will restore it to normal position to reengage the notch 97 with the roller 96. This permits the springs 91 to throw all of the control bars 70 and their corresponding column actuator locks 67 back to locking positions. If desired, however, a resetting may be effected in any column, or where a cipher is desired, by operating a columnar release as hereinafter explained.

There is also provided a columnar release mechanism employed for the individual column actuator locks 67, for example when it is desired to release either the column actuator lock of any selected column or to move the control bar 70 to its extreme releasing position, to release a numeral key 25 which has been previously "set" in that column. This columnar release mechanism may be employed for correcting an error in the key setting of any column, and permits a new key setting to be made in any column, if a key has been previously set in that column, without making it necessary to release the key setting in other columns, as would happen in an operation of the "key-set release" key 98. Referring especially to Fig. 12, each control bar 70 is provided at its extreme front end with a horizontal shoulder 99 on which rests the lower end of the key stem 100 of the small columnar release or "cipher" key 101. When said key 101 is depressed, the shoulder 99 is moved downwardly causing a leverage action to force the lower edge of the lock bar 70 toward the right of the machine, to release a numeral key 25 the shoulder of which is retained beneath a projection 92 of said control bar. Inasmuch as there are release keys 101 for each column, the setting of any individual column is subject to individual control and to resetting in any manner desired by the operator. When the finger is removed from a depressed key 101 the parts will be restored to normal position by the springs 91 corresponding to the control bar 70 which has been shifted by said key 101 to releasing position.

The setting of the machine for universal-key-driven actuation unlocks the universal-key 56 for the operation of the universal actuator. When the "universal-key drive" key 88 is depressed, the movement of the shift rod 78 toward the left of the machine withdraws the right-hand end 102 of said rod from locking position in a hole or socket 103 arranged in the path of disc 61 which is operatively connected by rod 223 with the universal-key 56, thus freeing the universal-key 56 for movement. This construction also prevents setting of the machine from universal-key-driven to individual key-driven actuation, except when the universal-key 56 and disc 61 are in their normal positions, since the movement of the disc 61 away from the normal always brings the disc 61 into the path of the shift bar 78 covering the hole or socket 103 and the shift bar cannot be operated by the "individual-key-drive" key 83, to release the column locks for individual-key-driven operation of the actuating mechanism, or by the key-set release key 98. When the disc 61 is in normal position, the universal-key 56, shaft 57 and associated parts will be locked against operation by the setting of the machine for individual key-drive, since the end 102 of the shift bar 78 enters the socket 103 and is in the path of the disc 61 to prevent oscillation of the disc 61.

As hereinbefore stated, each complete depression of the universal-key 56 produces first a counter-clockwise movement and next a clockwise movement of the shaft 40 (Fig. 4) and ordinal universal actuator plates 41. Those column actuators which have not been set for universal-key-driven operations are locked against movement by their corresponding column locks 67, but in the various orders in which key-setting has taken place, the respective column actuator arms 29 may move variably downwardly, in accordance with the digital value of their respective key-settings until their motion is arrested by the digital control device hereinafter explained. The dual flexible link mechanism connecting the universal actuator plates with the column actuators in the several orders, permits the constant oscillatory motion of the plates 41 in all orders, although column actuators have been set for relatively variable movements and in some orders, as required by the example to be performed, no setting of the column actuators may have taken place at all. Moreover, this operation is accomplished with a minimum resistance to the movement of the universal-key 56, and, in fact, the resistance to universal-key-drive movement is inversely proportional to the digital value of the key-setting in the various orders and to the number of orders set for operation, so that the greater the digital value of the factor set-up on the key-board, the less becomes the resistance. This is accomplished by releasing from all tension the springs 44 of the lower dual flexible link mechanisms, so that no resistance is imparted by said springs 44 to either the downward or the upward movement of the column actuator studs 49, and by releasing from tension the springs 50 of the upper flexible link mechanisms 42 so long as the corresponding column actuators are moving with the universal actuator plates 41 in either direction. This operation is as follows: On the counter-clockwise movement of a universal actuator plate 41 (Fig. 4), the upper flexible link mechanism 42 pulls down with said plate 41 the horizontal arm 29 of the corresponding column actuator, if said actuator has been previously set by the depression of a numeral key 25. There is no stretching or tensioning of the spring 50 so long as the arm 29 is moving downwardly, and, inasmuch as the stud 49 is traveling in the slot 48 of the ram of the lower flexible link mechanism 43, there is likewise no stretching or tensioning of the spring 44. When, however, the downward movement of the column actuator arm 29 has been completed to effect the required incremental accumulation and said column actuator arm has been arrested by the digital stop device, the spring 50 will be stretched or tensioned proportionally with the remainder of the counter-clockwise stroke of the universal actuator plate 41. During the clockwise return stroke of the universal actuator plate 41 (Fig. 4), the stud 49 travels freely in reverse direction in the slotted head of the ram 43 without tensioning the spring 44, and the pull on the spring 50 of the upper flexible link mechanism being released, the spring 50 retracts to lift up its ram 52 and also to restore the horizontal column actuator arm 29 to its normal elevated position. Inasmuch as there is no resistance to the downward movement of the column actuators, during the oscillatory motion of plates 41, the springs 50 have merely a minimum load to carry in depressing column actuators and thus the tension derived from such actuators as are locked against depression is reduced to a minimum. If there has been no key-setting of a column actuator in any order of the machine, the horizontal arm 29 is held against movement by its corresponding column lock 67, and the tensioning of the spring 50 of the corresponding flexible link mechanism will commerce at the beginning of the clockwise stroke of the universal actuator plate 41, and the return movement of said plate 41 allows the tension of spring 50 to pull back its column actuator plate 41 and the ram 52 into normal elevated position.

The digital stop or control device operates to insure accuracy of movement of the column actuators in transferring their incremental accumulations to the accumulator mechanism, whether the machine be operating in individual-key-driven actuation or in key-set universal-key-driven actuation. Pivotally mounted at 406 on a lever 403 mounted on a hub 402 adjacent the adding sector 400 of each column actuator is a digital stop bar 105 which extends to the front of the machine and has its front end pivoted at 106 to the top of a rocker arm 107, the latter being pivoted on a cross-rod 108. The said bar 105 is provided with a series of eight stops or projections 109 respectively corresponding to the column of digital or numeral keys of its corresponding order, with the exception of the nine key 25 and adapted to arrest the rearward movement of said bar 105 by the depression or setting of a key 25. The nine key and the movement of the sector 400 corresponding thereto represents the extreme movement of said sector, and such movement is preferably arrested by a fixed stop 109a attached to the framework, although, if desired, a further stop 109 for the nine key could be provided on the stop bar. The stops or projections 109 are located at different distances in front of the keys with which they respectively co-operate, the stop 109 corresponding to the "1" key being the nearest to said key and the stop corresponding to the "9" key being the farthest away. When a key 25 is actuated in individual-key-driven actuation or set for universal-key-driven actuation, the adding sector 400 of the corresponding column may move downwardly until the bar 105 has shifted the corresponding stop into engagement with the key depressed, whereupon the movement of the sector 400 is arrested.

In individual-key-driven actuation, the keys 25 have a relatively long motion, as hereinbefore explained, in accordance with their digital values, but in key-set actuation the several keys 25 of each order have a relatively short movement, both downwardly and upwardly, notwithstanding their digital values. The digital-control mechanism adapts the same series of stop lugs 109 on bar 105 to either the movement of the keys in individual-key-drive or the limited movement of the keys in universal-key-drive, by reason of the arrangement of the stops 109 on bar 105 with respect to the stop shoulders 25a on the co-operating keys. Inasmuch as the bar 105 moves progressively increasing distances rearwardly as determined by the value of the digital key operated, whether in universal-key-drive or individual key-drive, it is necessary that the stops 109 on bar 105 be differentially spaced from the respective keys with which they cooperate.

In order to prevent accumulative action upon setting-up the keys, when the machine is set for universal-key-driven operation, there is provided a keyboard non-adding lock for key-set action. At the forward end of the machine there is provided a transversely extending, pivotally mounted bar 283 provided with (see Figs. 4, 8 and 10) an arm 284 for each order of the machine, each of said arms being pivotally secured to an arm 285 of individual non-adding locks 286 by a slot and pin connection. The individual non-adding locks are bent to the left at their upper ends 293 forming a stop lug so that each stop lug is immediately under the free end of its respective column actuator 29.

A spring 287 is secured to an arm 288 that is fastened to the bar 283, and the other end of the spring 287 is secured to a non-add release device 289. This spring tends to hold the lock-bar 283, and locks 286, in position to prevent depression of the free ends of the column actuators, when the keys 25 are being depressed while the machine is set for key-set operation, and this spring 287 also tends to elevate the opposite end of the device 289. To a depending arm 290 of the release device 289 is pivotally secured a push-rod 291 that has a slotted connection with a stud 292 on said bar-arm 288. Upon setting of the keys, the locks prevent depression of the column-actuators, but when the universal key 56 is depressed the rod 223, whose rear end is connected with the key 56, rotates the pivotally mounted disc 61 toward the front of the machine and thereby causes the dolly-roll 297 to ride a cam surface 294, which forces the rear end of the release device 289 downward and moves the bar 283 about its pivot to swing the locks 286 and these stop lugs 293 from beneath the free ends of the column actuators just before the start of the down-stroke of the column actuators, then the dolly-roll rides along a neutral curved surface 295 which maintains the locks slightly out of the path of the free ends of the column actuators until the column actuators complete their up-stroke. As the universal-key 56 and the column actuators are elevated, the dolly-roll 297 rides upwardly on the neutral surface 295 and does not ride over the cam 294 until the free ends of the column actuators are above the stop lugs 293 of the locks 286.

When the machine is set for individual-key-driven actuation, such non-adding locks are not required. Mechanism is provided to render the non-adding locks inoperative, when the machine is set for individual-key-drive, comprising a bar 298 operatively connected with the walking beam 429, said bar having a slotted connection with a stud 300 on an arm 301 of the non-adding bar 283. When the "individual key-drive" key 83 is depressed said bar 298 pushes the stud toward the front of the machine to maintain the non-adding bar 283 and locks 286 away from the free ends 296 of the column actuators.

Such is, in brief outline, the construction and operation of the combined key-driven mechanism and key-set universal key, lever, crank, or motive power, driven mechanism of the above mentioned co-pending applications. It will be understood that these mechanisms are associated with various other mechanisms, for instance, various stop mechanisms and carry mechanism to control the accumulator mechanism contained within the shiftable carriage.

The present invention comprehends provision for the employment in machines of the above described type of features, shown and described in United States Patents 992,950; 1,028,344; 1,066,096; 1,072,933; 1,088,219; and 1,110,734;—comprising full stroke mechanism which will lock the keyboard or all of the columns of the keyboard against operation in event of an error or short stroke, and for controlling the actuating mechanism of the machine in its variable degrees of actuation, thus compelling full digital registration and return of the actuating mechanism. The present invention, however, contemplates a mechanism for accomplishing these results in which the lever antenna feature shown in said patents for setting the locks is dispensed with, and in which a full stroke dog device operating both forwardly and reversely is employed to control the actuating mechanism in its variable degrees of digital actuation, thereby compelling full digital registration and return of the actuating mechanism and all mechanism controlled through said full stroke, and for controlling the actuating through a trans-columnar device to trip the keyboard non-adding locks, provided in the machine of my aforesaid copending application Serial No. 107,527, in event of a partial down keystroke during individual-key-driven operation of the machine.

To alleviate the shock normally received by the fingers of an operator, during individual key-driven operation, or to the universal actuator mechanism, during universal drive operation, when the actuating mechanism is brought to a stop by the stop bar 105, provision has been made for an elastic motion or a cushioning of the stopping action to take place just before the digital movement of the actuating sector 400 has been completed through the use of an elastic connection of the digital stop bars 105 with the actuating sectors 400 and a positive connection of the actuating lever 27 with the actuating sector 400.

Referring to Figs. 4 and 7, when a key 25 is depressed, and the machine is set for individual-key drive, it depresses its column actuator 27 which draws its actuator sector 400, that is attached by link 401 to the actuator 27, downward with it, and its stop bar 105 comes in contact with the key stem 26 of the depressed key 25. The actuating sector 400 is pivoted on shaft 32 by a hub 402 integral with and forming a part of the sector 400. Mounted on the hub 402 and adjacent the sector 400 is a lever or arm 403 having its outer or free end flexibly connected with the sector 400 by a pin 404 fixed on lever 403 and operable within a short slot 405 of said sector 400, to allow limited movement of sector 400 independently of the lever 403, and having the same outer end positively connected with the stop bar 105 by means of a pivoted stud 406. Normally the pin 404 engages the rear end of the slot 405 in the actuating sector 400, as shown in Fig. 5, and is maintained there by means of a spring 407 which acts to hold the lever 403 and the sector 400 in said relation and until a stop lug 109 of the digital control bar 105 comes in contact with a depressed key stem 26 when a key 25 is depressed during actuation of the machine as will be later described. When, however, a stop lug 109 of the digital control stop bar 105 comes in contact with a depressed key stem 26, the lever 27, pulling downwardly on the link 401, positively connecting lever 27 with sector 400, tends to separate the actuating sector 400 from the lever 403, stretching the spring 407, until the pin 404 comes in contact with the front end of the slot 405 and completes the stopping of the column actuator 29 and sector 400, as shown in Fig. 6, thus producing an elastic motion just prior to the end or completion of the key stroke, and cushioning during such spring stretching the shock of the sudden stopping of the downward movement of the key 25.

Pivotally mounted at 408 on the sector 400 is a four-armed dog, two arms of which carry detents 409 and 410, respectively; the detent 409 co-acting with the ratchet teeth of the ratchet plate 411, as shown in Fig. 5, by falling over the ratchet teeth as the actuating sector 400 is swung rearwardly under key actuation. To maintain the detent 409 in contact with the ratchet teeth during such movement of sector 400, a cam lever 412 is pivoted at 413, on the arm of lever 403, and arranged to make contact with a roll 414 on the arm 415 of the four-armed dog; and is maintained in contact with said roll 414 by means of the spring 407, which is attached at one end to an ear 416 on the cam lever 412 and at the other end to the actuating sector 400 by pin 417.

Thus, tension of the spring 407 causes an upward swing of the cam lever 412 on its pin 413, which in turn urges the roll 414 forwardly and the detent 409 upwardly to engage the ratchet teeth of the ratchet bar 411 as long as the roll 414 is in position with respect to cam lever 412 as shown in Fig. 5, and incidentally as long as spring 407 holds the sector 400 in relation to the lever 403 as shown in Fig. 5. As the four-armed dog is drawn rearwardly by the downward swing of the sector 400 to which it is pivoted, the detent 409 of the dog is drawn over the ratchet teeth and the roll 414 exerts pressure against cam lever 412, forcing it slightly downwardly against the tension of the spring 407, but as the detent 409 drops off the point of a ratchet tooth, the cam lever 412 forces the detent 409 to the bottom of the next tooth, depending on the digital value of the key 25 depressed, that is, if a "1" key 25 is depressed the detent passes over only a single tooth of the ratchet plate, if a "2" key is depressed the detent passes over two teeth, if an "8" key is depressed the detent 409 passes over eight teeth, etc. This action continues until the stop bar 105 is arrested and held against further movement by a depressed key 25. When the stop bar 105, and consequently the lever 403 and cam lever 412, is so arrested, the further downward movement of the sector 400, and consequently the four-armed dog and its pivot pin 408, separates the sector 400 from the lever 403 thus drawing the roll 414 rearwardly over the pyramidal cam projection of the cam lever 412 until in engagement with the opposite incline of the pyramidal cam projection which tilts the four-armed dog so that the rear detent 410 is thrown partly upwardly as shown in Fig. 6. When the depressed key 25 is released, sector 400 rises slightly until pin 404 again retakes its normal position in the slot 405, and, as the roll 414 has been drawn over to the opposite incline of the pyramidal hump of the cam lever 412, this action tilts detent 410 further upwardly until it engages a ratchet plate 418 adjacent to and to the right of the ratchet plate 411. Under continued release and upward movement of the key 25, the detent 410 will fall over the ratchet teeth of the ratchet 418 as the sector 400 and column actuator 27 returns under the spring action of spring 44. The pressure effect of the cam lever 412 on the roll 414 of the four-armed dog device gives, during the upward movement of the sector 400, the same action to detent 410 as that described in connection with detent 409 and ratchet plate 411, except that the direction of forces of one are reverse to that of the other.

The ratchet plate 411 is for full stroke action on the downward stroke of a key and prevents return of the sector 400 and lever 27 until the depressed key has made a complete stroke, and the ratchet plate 418 is for full stroke on the upstroke of a key and prevents re-depression of a key that has been fully depressed before it makes a complete upstroke after such complete depression. As the ratchet plates 411 and 418 are in different planes, the detent 409 projects to the left to engage ratchet plate 411, while the detent 410 projects to the right to engage the ratchet plate 418. Ratchet plate 418 is rigidly mounted on shafts 115′ and 419, thus any rearward action of the dog detent 410 would be blocked, preventing any reverse action of a key 25 before complete return to normal, as the detent 410, in engagement with the ratchet teeth of plate 418, will not allow sector 400 to be depressed.

As the sector 400 and four-armed dog device thereon near their normal higher position, an upwardly projecting arm 408a on the dog engages a pin 408b, fixed in the ratchet plate 418, just before the sector 400 reaches normal. When the pin 408b is engaged by the arm 408a, arm 408a is urged rearwardly causing roll 414 to be thrown to the angle of the pyramidal hump of the lever 412 and again bringing the detent 409 into engagement with its ratchet plate 411, thereby effecting a reversal of the dog for another down key-stroke.

Referring to Fig. 5, the ratchet plate 411 is pivoted at its rear end to a swinging arm 420 and at its front end to another swinging arm 421, the rear arm being pivoted to the shaft 115′ and the forward swing arm being pivoted to the shaft 419. In order to keep the ratchet plate 411 in a set position as the detent 409 of the four-armed dog is drawn over its ratchet teeth on a down stroke of a key 25, a stop arm 422 is provided to engage the eccentric stop bushing 423 that also acts as a stop for the normal position of sector 400. Another stop arm 424 is provided on the ratchet plate 411 in event of the release of a key 25 on a partial down stroke. Slight movement of the plate 411 is produced by the backward pressure of the sector 400 through the detent 409 of the four-armed dog device, and when such movement occurs, the forward swinging arm 421 swing forwardly with said plate, carrying with it its downwardly projecting arm 425 which is provided with a bent lip 426. Extending transversely of the machine from side to side, and just at the rear of the "9" keys is a shaft 427 that is journaled in the framework and that is provided with arms 428 so arranged thereon that there is one for each ordinal column of keys situated in position to be engaged by the bent lip 426 of the swinging arm 421 as the ratchet plate 411 of their respective orders is pressed rearward in event of a partial down key-stroke of a key 25 in said orders. Thus, in the event of a partial key-stroke of a key 25 in any one or more orders of the machine, the shaft 427 will be rocked in an anti-clockwise direction as viewed in Figs. 5, 6 and 7.

Referring to Fig. 8, the walking beam lever 429, that is operatively connected with individual-key-drive key 83 and the universal-key-drive key 88, is connected with the link 298 by an independent third arm 430 pivoted on the shaft 86 and to the link 298. Normally, the arm 430 is held in position with respect to the beam lever 429 to operate therewith. For so holding the arm 430 in such position, there is provided a latch 431, pivoted to the lever 429, which engages the right angle lip 432 of the lever 430 and which is maintained in position for engagement with the lip 432 by means of a spring 433 connecting the opposite end of the latch 431 with the front end of beam lever 429, and tending to draw the said opposite end upwardly toward the forward end of beam lever 429. The latch 431 is provided with a stop arm 434 adapted for engagement with a stop pin 435 to limit the throw of the latch 431 under the influence of the spring 433 whenever the latch is disconnected from the lip 432 of arm 430. The latch 431 is also provided with a downwardly projecting arm 436 to which is attached, by means of a slot and pin connection, a link 437 having its rear end pivoted to an arm 438 that is fast to the left-hand end of the rock shaft 427.

When the individual-key-drive key 83 is depressed, the upward swing of the forward end of the beam carries the latch 431 with it, which arm under tension of spring 433 carries the lip 432 and its arm 430 forwardly toward the front of the machine. In so doing, the link 298, being fulcrumed at 300 and pivoted to arm 430, straightens out, thus pressing lever 301 downwardly to rock shaft 283, thus throwing all of the lock levers 286 into position so that their bent lips 293 are out of engagement with the column actuator levers 27, allowing the column actuator levers 27 to be freely depressed. In event of a partial down stroke and release of a key 25, the upward pressure of its sector 400, through detent 409 moves plate 411 slightly forwardly swinging arm 421 forwardly with it. Such movement of arm 421, through arm 425 and lip 426, rocks its arm 428 and shaft 427 counter-clockwise (viewing Fig. 7). This movement of shaft 427, through arm 438, draws the link 437 rearwardly of the machine which pulls the downwardly projecting arm 436 of the latch 431, thereby releasing the latch 431 from the bent lip 432 of the lever 430. The lever 430, being loosely pivoted on the shaft 85, forms a pair of toggle links with the link 298 when key 83 is depressed, and, when released from the latch 431, doubles up under pressure on the arm 301 of the spring 439 attached to the lever 301 and to the framework at 440.

When the arm 430 and lip 432 are released from the latch 431 by the rearward movement of the link 437, just above described, the spring 439 pulling on arm 301 doubles up the toggle, releasing arm 301 and shaft 283 from the pressure holding them and their lock levers 286 out of locking position with respect to the column actuators 27, thereby permitting the spring 439 and the spring 287 to rock the shaft 283 and, through arms 284, throw the lock levers 286 rearwardly of the machine and under the front end of all of the column actuating levers 27 that are not held down by a key 25 or by the ratchet mechanism plate 411, thus locking all of the levers 27 against additive actuation except the one depressed erroneously. Upon correct depression or completion of the stroke of the partially depressed key, the four-armed dog device is reversed and the column actuator 27 and sector 400 rise as is the case when the keys are correctly manipulated, thus freeing the mechanism in this respect for further additive accumulation. But when the column actuator 27 rises upon correction of the mismanipulated key stroke, the end 296 of the column actuator 27 wipes the lip 293 forwardly which presses the arm 285 downwardly for relative movement, through a slot and pin connection, with its arm 284 until the actuator 27 passes above the lip 293 at which time pressure of springs 439 and 287, through arms 284, the slot and pin connection, and arm 285, causes the lock 286 and lip 293 to retake their locking position beneath the column actuator 27, thus completing the locking of the entire keyboard.

To limit the movement of the toggle lever 430 as it swings rearwardly in the doubling up of the toggle under the influence of spring 439, an extension arm 441 is provided on the lever 430 for engagement with a tie rod bushing 442 that holds the framework of the machine in spaced relationship.

A pin 443, fast on the walking beam lever 429, is provided for engagement with the lever 430 to act as a forward stop for the lever 430. This pin 443 is also employed to give movement to the lever 430 whenever the universal key 88 is depressed.

When the keyboard has been completely locked, after mismanipulation and correction of a key 25, as above described, the keyboard locks 286 must, of course, be cleared before an operator may proceed. As the complete depression of the mismanipulated key 25 has relieved the arm 428 from forward pressure and allowed the shaft 427 to return clockwise, the arm 438 is allowed to swing forward carrying with it the link 437 to free the latch 431, through the slotted connection of link 437 with arm 436, so that the latch 431 may again drop, under tension of spring 433, into latching position with its arm 434 against stop pin 435. Under these conditions, however, the latch will not engage the lip 432 of the toggle lever 430, because the lever 430 is still in its rearmost position from the doubling up of the toggle. Therefore, the universal-key-drive key 88 is first depressed and then the individual key-drive key 83 is depressed to clear the keyboard of the locks 286, and to restore the mechanism for further individual-key-driven operation. The initial depression of the universal-drive-key 88 causes the front end of the walking beam lever 429 to rock downward and the latch 431 to swing rearwardly until it latches over the bent lip 432 of the toggle lever 430. The subsequent depression of the individual-key-drive key 83 causes the front end of the walking beam lever 429 to rock upwardly and the latch 431 to be swung forwardly carrying with it the third arm of toggle lever 430. The forward swinging of the latch 431 and toggle lever 430, by reason of the latching of the lever 430 to the beam 429 as fixed connection through pin 443 and latch 431, causes levers 430 and 298 to make up again as a toggle to throw and to hold the locks 286, through arm 301, bar 283 and arms 285, out from under the actuating levers 27, thus clearing the keyboard for further individual key-driven operation.

When the keys 88 or 83 are depressed for converting the machine from one type of operation to the other, and there has been no setting of the locks 286 by mismanipulation of a key 25 during individual-key-driven operation, the beam 429, latch 431 and lever arm 430 move as a unit and the latch is not released from the lip 432. For instance, during depression of key 88 the forward end of beam 429 moves downwardly carrying with it latch 431 and pin 443. Pin 443 presses lever arm 430 rearwardly and latch 431, through tension of spring 433, holds lever arm 430 to pin 443 during the downward movement of key 88; during depression of key 83 the rearward end of beam 429 moves downwardly and the forward end upwardly carrying latch 431 upwardly with it, the latch, under tension of spring 433, holding lever arm 430 in engagement with pin 443 and carrying the lever arm 430 forwardly.

The invention as hereinabove set forth is embodied in a particular form but may be variously embodied within the scope of the claims hereinafter made.

I claim:

1. In a calculating machine, in combination: ordinal actuating mechanism; keys therefor; universal actuator means therefor operable upon setting of said keys; means for selectively operating said actuating mechanism by key-set universal actuation and by direct key-driven operation; locking devices for locking the keyboard against key depression that would operate the adding mechanism upon setting of said keys during key-set operation; means operable by said universal actuator for releasing the keyboard of said locking devices and devices operable under direct key-actuation to set said keyboard locking devices in event of a partial key-stroke to lock all other columns or orders of the actuating mechanism against actuation until said locking devices have been cleared.

2. In a calculating machine, in combination actuating mechanism operable by direct key actuation and by key-set actuation; keys for driving and for setting said actuating mechanism; shiftable means adapted to be shifted into position for key-set actuation, said means comprising locking devices for preventing movement of the actuating mechanism by direct key actuation while said means is shifted into position; and devices operable under direct key actuation to set said locking devices in event of partial key strokes during direct key actuation operation of the machine.

3. In a combined key-driven and key-set operated calculating machine having a board of keys for driving and for setting actuating mechanism in said machine and having keyboard locking devices for locking the keyboard against accumulative manipulation, in combination: devices adapted for compelling full key-value-stroke of the actuating mechanism under both key-driven and key-set operation and adapted for setting said keyboard locking devices in event of a partial down keystroke, under key-driven operation, to lock the rest of the keyboard against manipulation.

4. A combined key-driven and key-set operated calculating machine having a board of keys for driving and for setting actuating mechanism in said machine and having keyboard locking devices for locking the keyboard against accumulative manipulation, in combination: devices adapted for compelling full key-value-stroke of the actuating mechanism under both key-driven and key-set operation and adapted for setting said keyboard locking devices in event of a partial down keystroke, under key-driven operation, to lock the rest of the keyboard against manipulation; and means for clearing the keyboard of said keyboard locking devices at the will of an operator.

5. In a combined key-driven and key-set operated calculating machine having a board of ordinal columns of keys for driving and for setting actuating mechanism in said machine and having keyboard locking devices for locking the keyboard against accumulative manipulation, in combination: devices adapted for compelling full key-value-stroke of the actuating mechanism under both key-driven and key-set operation and adapted for setting said keyboard locking devices in event of a partial down key-stroke, under key-driven operation, to lock the rest of the keyboard against manipulation; means for clearing the keyboard of said keyboard locking devices at the will of an operator; and devices for compelling a complete return on the upstroke of each of the keys of said keyboard before another keystroke in the same order therewith may be effected.

6. In a combined key-driven and key-set operated calculating machine having a board of ordinal columns of keys for driving and for setting actuating mechanism in said machine and having keyboard locking devices for locking the keyboard against accumulative manipulation, in combination: devices adapted for compelling full key-value-stroke of the actuating mechanism under both key-driven and key-set operation and adapted for setting said keyboard locking devices in event of a partial down keystroke, under key-driven operation, to lock the rest of the keyboard against manipulation; and devices for compelling a complete return on the upstroke of each of the keys of said keyboard before another keystroke in the same order therewith may be effected.

7. In a calculating machine, in combination key-driving mechanism and key-set mechanism for actuation of adding mechanism; ordinal adding mechanism set in motion by either of said mechanisms and operable with a downstroke and an upstroke; accumulator devices for accumulating the additive degrees of actuation of said adding mechanisms on upstrokes thereof; means connected with said adding mechanism to prevent any additive degree of actuation to be transmitted to said accumulator mechanism from the individual orders of the adding mechanism until a full downward stroke of the value of the keys struck or set in the respective orders has been accomplished in the individual orders.

8. In a calculating machine, in combination key-driving mechanism and key-set mechanism for actuation of adding mechanism; ordinal adding mechanism set in motion by either of said mechanisms and operable with a downstroke and an upstroke; accumulator devices for accumulating the additive degrees of actuation of said adding mechanisms on upstrokes thereof; means connected with said adding mechanism to prevent any additive degree of actuation to be transmitted to said accumulator mechanism from the individual orders of the adding mechanism until a full downward stroke of the value of the keys struck or set in the respective orders has been accomplished in the individual orders; and devices for compelling a complete upstroke of each of the ordinal adding mechanisms that has made a full downstroke before another downstroke may be effected by the same ordinal adding mechanism.

9. In a calculating machine, in combination key-driving mechanism and key-set mechanism for actuation of adding mechanism; ordinal adding mechanism set in motion by either of said mechanisms and operable with an idle and an active stroke; accumulator devices for accumulating the additive degrees of actuation of said adding mechanism on the active strokes thereof; means connected with said adding mechanism to prevent any additive degree of actuation to be transmitted to said accumulator mechanism from the individual orders of the adding mechanism until a full idle-stroke of the value of the keys struck or set in the respective orders has been accomplished in the individual orders; and devices adapted to lock the rest of the keyboard and operable by said means in event of an incomplete idle stroke of said adding mechanism by a partial key-stroke during key-driven operation.

10. In a calculating machine, in combination key-driving mechanism and key-set mechanism for actuation of adding mechanism; ordinal adding mechanism set in motion by either of said mechanisms and operable with a downstroke and an upstroke; accumulator devices for accumulating the additive degrees of actuation of said adding mechanisms on upstrokes thereof; means connected with said adding mechanism to prevent any additive degree of actuation to be transmitted to said accumulator mechanism from the individual orders of the adding mechanism until a full downward stroke of the valve of the keys struck or set in the respective orders has been accomplished in the individual orders; devices for compelling a complete upstroke of each of the ordinal adding mechanisms that has made a full downstroke before another downstroke may be effected by the same ordinal adding mechanism; and devices adapted to lock the rest of the keyboard and operable by said means in event of an incomplete downstroke of said adding mechanism by a partial key-stroke during key-driven operation.

11. In a calculating machine comprising ordinal actuators; ordinal columns of depressible keys therefor; a digital stop device for each of said ordinal actuators for digitally controlling their degree of actuation, according to the key depressed, said stop devices being connected to said actuators and movable thereby into contact with a depressed key to effect the digital control in combination: full stroke mechanisms for each of said actuators, said mechanisms being connected to and movable with their respective actuators to prevent return of the actuators until digital actuation of said actuators determined by the keys has been completed; said full stroke mechanisms being adapted to be cleared by limited movement of said actuators relative to said digital stop devices at the completion of each down key-stroke so as to allow the return of the actuators to normal position.

12. In a calculating machine comprising ordinal columns of depressible keys; ordinal actuators set in motion by said keys; a digital stop device for each of said ordinal actuators for digitally controlling their degree of actuation, according to the key depressed, said stop devices being connected to said actuators and movable thereby into contact with a depressed key to effect the digital control; in combination: full stroke mechanisms for each of said actuators, said mechanisms being connected to and movable with their respective actuators to prevent their return until predetermined digital actuation of said actuators has been completed by said keys; said full stroke mechanisms being adapted to be cleared by limited movement of the actuators relative to said digital stop devices at the completion of each down key-stroke so as to allow the return of the actuators to normal position; and also being adapted to act on the return strokes of said actuators to compel a complete return of said actuators before another down key-stroke thereon may be effected.

13. In a calculating machine comprising ordinal columns of depressible keys; ordinal actuators set in motion by said keys; a digital stop device for each of said ordinal actuators for digitally controlling their degree of actuation, according to the key depressed, said stop devices being connected to said actuators and movable thereby into contact with a depressed key to effect the digital control; in combination: full stroke mechanisms for each of said actuators, said mechanism being connected to and movable with their respective actuators to prevent their return until predetermined digital actuation of said actuators has been completed by said keys; said full stroke mechanisms being adapted to be cleared by limited movement of the actuators relative to said digital stop devices at the completion of each down keystroke so as to allow the return of the actuators to normal position; and also being adapted to act on the return strokes of said actuators to compel a complete return of said actuators before another down keystroke thereon may be effected; and locking devices set in motion by said full stroke mechanism in event of a partial key-stroke in any order of the machine to lock all other orders of the machine against key actuation.

14. In a calculating machine comprising ordinal registering devices; reciprocal ordinal actuators for said registering devices adapted to be reciprocated by movement of keys; in combination: a ratchet dog for each of said actuators and partaking of the movements thereof; a movable ratchet plate, mounted independently of said actuators for each of said ordinal actuators over which the ratchet dogs are drawn as the actuators move in additive actuation; keys for operating the said actuators in an additive movement; springs for returning the said actuators to their normal positions and adapted, in event of any but a full stroke of the actuators, to cause the ratchet dogs of the actuators to move the said ratchet plates; and keyboard locking devices operatively connected with said ratchet plates to lock all of the orders of the actuators, other than the order or orders in which there has been a stroke less than a full one, against movement when any of said ratchet plates are moved by said ratchet dogs.

15. In a key-driven calculating machine comprising ordinal actuating mechanisms; ordinal columns of depressible keys therefor; ordinal differential stop-bars for arresting and limiting the movement of the actuating mechanisms under key-driven operation; ordinal cushioning devices respectively connecting an ordinal actuating mechanism with its differential stop-bar; in combination: a reversible full-stroke device on each of said actuating mechanisms and movable therewith for compelling down strokes thereof of full key-value; a cooperating member for each of said full-stroke devices adapted for preventing reverse movement thereof prior to their reversal; said cushioning device being adapted to maintain said full-stroke devices against reversal until said stop-bars are arrested and being adapted for thereafter effecting a limited movement relative to said differential stop-bars of said actuating mechanisms and full-stroke devices prior to complete stopping thereof and thereby cushion said stopping and reverse said full-stroke devices.

16. In a key-driven calculating machine comprising ordinal actuating mechanisms; ordinal columns of depressible keys therefor; devices for locking said actuating mechanisms against actuation by said keys; ordinal differential stop-bars for arresting and limiting the movement of the actuating mechanisms; ordinal cushioning devices respectively connecting an ordinal actuating mechanism with its differential stop-bar; in combination a reversible full-stroke device on each of said actuating mechanisms and movable therewith for compelling downstrokes thereof of full key-value; a cooperating member for each of said full-stroke devices adapted for preventing reverse movement thereof prior to their reversal and movable on such reverse movement; lock tripping means operable by said cooperating members on movement thereof during reverse movement of said full-stroke devices; said cushioning devices being adapted to maintain said full-stroke devices against reversal until arrestment by said stop-bars and being adapted for thereafter effecting a limited movement of said actuating mechanisms and full-stroke devices prior to complete stopping thereof and thereby cushion said stopping and reverse said full-stroke devices.

17. In a key-driven calculating machine comprising ordinal actuating mechanisms; ordinal columns of depressible keys therefor; devices for locking said actuating mechanisms against actuation by said keys; ordinal differential stop-bars for arresting and limiting the movement of the actuating mechanisms; ordinal connecting devices respectively connecting an ordinal actuating mechanism with its differential stop-bar; in combination a reversible full-stroke device on each of said actuating mechanisms and movable therewith for compelling downstrokes thereof of full key-value; a cooperating member for each of said full-stroke devices adapted for preventing reverse movement thereof prior to their reversal and movable on such reverse movement; lock tripping means operable by said cooperating members on movement thereof during reverse movement of said full-stroke devices; said connecting devices being adapted to maintain said full-stroke devices against reversal until arrestment by said stop-bars and being adapted for a limited movement thereafter and thereby reverse said full-stroke devices.

18. In a key-driven calculating machine comprising ordinal actuating mechanisms; ordinal columns of depressible keys therefor; ordinal differential stop-bars for arresting and limiting the movement of the actuating mechanisms; ordinal connecting devices respectively connecting an ordinal actuating mechanism with its differential stop-bar; in combination a reversible full-stroke device on each of said actuating mechanisms and movable therewith for compelling downstrokes thereof of full key-value; a cooperating member for each of said full-stroke devices adapted for preventing reverse movement thereof prior to their reversal; said connecting devices being adapted to maintain said full-stroke devices against reversal until arrested by said stop-bars and being adapted for thereafter effecting a limited movement of said actuating mechanisms and full-stroke devices relative to said differential stop-bars prior to complete stopping thereof and thereby reverse said full-stroke devices.

19. In a calculating machine having ordinal column actuators, ordinal columns of depressible keys therefor, ordinal differential stop-bars adapted to be arrested for limiting the degree of digital movement of the actuators according to the keys depressed; each of said actuators being connected with their respective stop-bars for limited movement relative thereto; springs connecting the ordinal actuators with their respective stop-bars to hold the actuators from movement relative to the stop-bars until after the stop-bars are arrested and to cushion the stopping of the actuators by the stop-bars during subsequent limited movement of the actuators; a ratchet dog for and movable with each of said actuators; a movable ratchet plate for each of said dogs and movable on their respective actuators; means operable by the limited movement of the respective actuators for freeing their movable ratchet plates from their ratchet dogs; and column-actuator locking devices connected with said ratchet plates and rendered operative by a ratchet plate in any order on reverse movement of its dog.

20. In a calculating machine having ordinal column actuators, ordinal actuator sectors positively connected thereto, ordinal columns of depressible keys for said actuators; ordinal differential stop-bars adapted to be arrested for limiting the degree of digital movement of the actuators and their sectors according to the keys depressed; each of said ordinal sectors having limited movement relative to its stop bar springs adapted to move the stop-bars with the sectors upon movement of the actuators and to hold the sectors from movement relative to the stop-bars until after the stop-bars are arrested; a ratchet dog for and movable with each of said actuator sectors; a movable ratchet plate for each of said dogs and movable on reverse movement of said dogs prior to said limited movement of their respective actuator sectors relative to their respective stop-bars; means operable by the limited movement of the respective sectors for freeing their movable ratchet plates from their ratchet dogs; and column actuator locking devices connected with said ratchet plates and rendered operative by movement of a ratchet plate in any order on reverse movement of its dog.

21. In a calculating machine comprising ordinal column actuators; ordinal columns of depressible keys therefor; each of said column actuators having an actuating sector positively connected thereto; in combination a differential stop-bar connected to the sector for limited movement relative thereto and adapted to be arrested to limit the movement of the actuator and its sector and provided with a cam pivotally mounted thereon; a spring connecting the sector with the cam and adapted to move the stop-bar with the sector and to hold the sector against limited movement relative to the stop-bar until after the stop-bar is arrested; a pair of ratchet plates; and a reversible pawl device pivotally mounted on and movable with the sector, said pawl device having a first pawl for engagement with one ratchet plate during the driving stroke of the actuator and a second pawl for engagement with the other ratchet plate during return stroke, and a cam arm engageable with said cam to maintain the first pawl in engagement with its ratchet plate and movable over the cam during limited movement of the sector to reverse the pawl device and maintain the second pawl in engagement with its ratchet plate during the return stroke, and a restoring arm engageable with an abutment on completion of the return stroke to restore the first pawl to its ratchet plate.

22. In a calculating machine comprising ordinal accumulator mechanism, ordinal actuators therefor; key set means for said actuators; ordinal keys for said key set means, and means for operating said actuators when set by said keys, the combination of partial key-value stroke locking means controlled by said actuators and adapted for locking the actuators in their incomplete position on incomplete strokes thereof.

23. In a calculating machine comprising ordinal accumulator mechanism, ordinal actuators therefor, key set means for said actuators, ordinal keys for said key set means, and means for operating said actuators when set by said keys, the combination of partial key-value stroke locking means controlled by said actuators and adapted for locking the actuators on partial key-value strokes thereof.

24. In a calculating machine comprising ordinal accumulator mechanism, ordinal actuators therefor, key set means for said actuators, ordinal keys for said key set means, and means for operating said actuators when set by said keys, the combination of partial key-value stroke locking means controlled by said actuators and adapted for compelling a full digital actuation of the actuators for the value of the keys set therefor.

25. In a key set calculating machine comprising ordinal actuators; key-set means therefor including ordinal keys; a digital stop device for each of said ordinal actuators controlling their degree of actuation according to the key set, said stop devices being connected to said actuators and movable thereby into contact with a set key and said actuators having a limited movement relative to their stop device after such contact; in combination a full stroke mechanism for each of said actuators, each said mechanism being connected to and movable with its actuator and preventing it from returning until the digital stop device therefor engages the keys for the actuator; and each of said full stroke mechanisms being adapted to be cleared by the limited movement of the actuator relative to the digital stop devices so as to allow of the return of the actuators.

In testimony whereof I have hereunto set my hand.

JOSEPH A. V. TURCK.